United States Patent [19]
Smith, Jr. et al.

[11] Patent Number: 5,571,975
[45] Date of Patent: Nov. 5, 1996

[54] POWER ABSORBING DYNAMOMETER

[75] Inventors: Joseph L. Smith, Jr., Concord, Mass.; Edward J. Ognibene, Ossining, N.Y.

[73] Assignee: Massachusetts Institute of Technology, Cambridge, Mass.

[21] Appl. No.: 431,313

[22] Filed: Apr. 28, 1995

[51] Int. Cl.$^6$ .............................. G01L 3/00; F16D 57/00
[52] U.S. Cl. .................... 73/862.16; 188/296; 73/862.14
[58] Field of Search ........................... 73/862.14, 862.15, 73/862.16; 188/296

[56] References Cited

U.S. PATENT DOCUMENTS

| | | | |
|---|---|---|---|
| 669,568 | 3/1901 | Webb | 73/862.14 |
| 1,161,117 | 11/1915 | Ehrhart et al. | 159/1.1 |
| 1,228,215 | 5/1917 | Junkers | 188/290 |
| 1,718,175 | 6/1929 | Nilson | 188/290 |
| 2,349,921 | 5/1944 | Wemp | 188/296 |
| 2,425,171 | 8/1947 | Bennett et al. | 73/862.14 |
| 2,603,968 | 7/1952 | Cline | 73/862.14 |
| 2,634,830 | 4/1953 | Cline | 188/296 |
| 2,672,953 | 3/1954 | Cline | 188/296 |
| 2,672,954 | 3/1954 | Bennett | 73/862.14 |
| 2,689,476 | 9/1954 | Van Ornum | 73/862.14 |
| 3,598,208 | 8/1971 | Bronder | 188/290 |
| 3,809,017 | 5/1974 | Eskell | 122/11 |
| 3,818,754 | 6/1974 | Asmus | 73/134 |
| 3,942,363 | 3/1976 | Swis et al. | 73/862.14 |
| 4,344,479 | 8/1982 | Bailey | 165/109 |
| 4,864,872 | 9/1989 | Stahl | 188/296 |
| 4,899,595 | 2/1990 | Warsaw | 73/862.14 |
| 4,982,819 | 1/1991 | Koshimo | 188/296 |
| 5,279,262 | 1/1994 | Muehleck | 122/26 |

OTHER PUBLICATIONS

"Computer Simulation of a Variable Fill Hydraulic Dynamometer", J. K. Raine and P. G. Hodgson, *Proc. Instn. Mech. Engrs.*, vol. 205, 1991, pp. 155–163.

"A Performance Prediction of Hydrodynamic Torque Converter", K. Minato, K. Sakamato, M. Takagi, K. Fujitani, *SAE Transactions*, 1990, v99, sec. 6., pp. 740–747.

"A High Speed Low torque Fluid Dynamometer", S. M. Yahya, D. P. Agrawal, *Instruments India*, Jan.–Feb. 19975, pp. 23–26.

"Water Brake Status (Considering Cavitation)", W. J. Courtney, *ASME, Fluids Engineering Division*, vol. 79, 1989, pp. 87–92.

"Movable Shroud Changes Dynamometer Blades' Effective Length", Robert N. Boggs, *Design News*, Sep. 4, 1989, pp. 178–179.

"Dynamometer tackles compact engine tests", *Engineering News*, one page.

*Primary Examiner*—Richard Chilcot
*Assistant Examiner*—Ronald Biegel
*Attorney, Agent, or Firm*—Testa, Hurwitz & Thibeault, LLP

[57] ABSTRACT

A power absorbing dynamometer includes a stator having an inside stator surface and a rotor having an inside rotor surface. The rotor is rotatable by a mechanical power source. The inside rotor and stator surfaces generally face and oppose each other. Together, the rotor and stator define a passage bounded substantially by the inside surfaces thereof. The passage preferably is a torus-shaped passage within the dynamometer. Liquid is introduced into the passage via a port of the dynamometer. The dynamometer also includes means for developing and maintaining within the passage a unique liquid flow which is a substantially helical recirculating flow of the liquid on the inside rotor and stator surfaces as the rotor is rotated by the mechanical power source. The liquid is thereby heated or vaporized as the rotor is rotated by the mechanical power source, and power absorbed from the mechanical power source is related to a rate at which the liquid is heated or vaporized. The power absorbing dynamometer preferably causes at least some of the liquid in the passage to boil and vaporize due substantially only to friction associated with the substantially helical recirculating flow of the liquid on the inside rotor and stator surfaces. The power absorbed from the mechanical power source is related to the rate at which the liquid vaporizes. The vaporized liquid preferably collects in the center of the passage where it can be easily vented.

34 Claims, 11 Drawing Sheets

POWER ABSORBING DYNAMOMETER

FIELD OF THE INVENTION

This invention relates to power absorbing dynamometers and, more particularly, to power absorbing dynamometers that develop and maintain an organized liquid flow.

BACKGROUND OF THE INVENTION

In general, a dynamometer is a device for operating as a duty load simulator or for measuring the output power of a power generating device or a mechanical power source such as an electric motor, a gasoline or diesel engine, a gas turbine, etc. The measurement may be made in terms of the rotations per minute of a rotating shaft, the torque, or some other form of the source's output power. The primary function of any dynamometer is to produce a load on the source being tested or a torque that acts on an output shaft in a direction opposite to rotation. That is, the dynamometer acts as a damper.

Electric eddy-current generators, Froude-type water brakes, and perforated disk evaporators are some of the known kinds of dynamometers. These known kinds of dynamometers operate according to various physical principles.

Some known dynamometers utilize fluid friction or momentum exchange of water or other liquid to dissipate mechanical power delivered from a connected mechanical power source (e.g., the crankshaft of an engine to be tested, an axle shaft to be slowed, etc.). These known dynamometers use a rotor operating in a bath or spray of water or other liquid within a stator. In accordance with the first law of thermodynamics regarding conservation of energy, the power dissipated in the liquid is converted to heat within the liquid, and the liquid is heated at a rate proportional to the amount of power being dissipated. The heated liquid is discharged from the dynamometer as hot water and simultaneously replaced by cold water.

In general, each known kind of dynamometer is subject to at least one of the following shortcomings: lack of portability due to low power density (i.e., large size and/or weight), complex or costly external equipment required to operate the dynamometer (e.g., condensing equipment or external liquid cooling equipment), erosion of components due to cavitation, short useful mechanical life of components, and limited power absorption capabilities.

SUMMARY OF THE INVENTION

It is an object of the invention to provide a power absorbing dynamometer designed to be driven by rotating shafts of mechanical power sources such as engines for aircraft, helicopters, automobiles, trucks, etc.

It is also an object of the invention to provide a power absorbing dynamometer having high power density. The dynamometer is relatively small compared to known devices, and therefore the dynamometer is easy transported to the location where it is to be used.

It is another an object of the invention to provide a power absorbing dynamometer that develops and maintains an organized liquid flow therein. The flow preferably is a substantially helical liquid flow within the dynamometer.

It is yet another object of the invention to provide a power absorbing dynamometer that is more reliable and that has a longer useful lifetime than known devices. The dynamometer absorbs power primarily by friction associated with the organized liquid flow therewithin and generally not by incidence losses or cavitation. There is minimal "hurling" of the liquid against any surfaces, and the liquid does not "slap" against or "collide" with any surfaces. Instead, the liquid flows in an organized manner whereby viscous forces result in power absorption, and the dissipative effects of the flowing liquid are distributed over the entire flow surface as opposed to being localized at one or more points. The dynamometer thus generally experiences substantially less component wear and degradation compared to known devices.

It is still another object of the invention to provide a power absorbing dynamometer that absorbs power without using condensing equipment or external liquid cycling.

It is a further object of the invention to provide a power absorbing dynamometer that can develop and maintain a liquid flow within a torus-shaped working compartment (passage) of the dynamometer. The liquid flow is essentially a sheet that helically recirculates on the inside surface of the torus. This swirling toroidal flow results in a centrifugally self separating vapor core being produced. The vapor generally is not mixed in with the liquid, and therefore the vapor can easily be vented out of the dynamometer.

A power absorbing dynamometer according to the invention includes a stator with an inside surface and a rotor with an inside surface that generally faces and opposes the stator's inside surface. The rotor is rotatable by a mechanical power source. The rotor and stator together define a passage bounded substantially by the inside surfaces thereof. Liquid is introduced into the passage via a port of the dynamometer. The dynamometer also includes means for developing and maintaining within the passage a substantially helical recirculating flow of the liquid on the inside surfaces of the rotor and stator as the rotor is rotated by the mechanical power source. The liquid is thereby heated or vaporized by primarily viscous dissipation, and power absorbed from the mechanical power source is related to a rate at which the liquid is heated or proportional to an amount of liquid being vaporized.

In a preferred embodiment, the power absorbing dynamometer causes at least some of the liquid in the passage to vaporize due substantially only to friction associated with the substantially helical recirculating flow of the liquid on the inside rotor and stator surfaces. The power absorbed from the mechanical power source is related to a rate at which the liquid vaporizes. The vaporized liquid collects in the center of the passage where it can be easily vented.

Also, the stator and rotor together preferably form a torus-shaped passage. The stator defines an outer stationary part of the torus-shaped passage, and the rotor defines an inner rotatable part of the torus-shaped passage. The torus typically is only partially filled with liquid, and the power absorption at a particular rotor speed can be varied by adjusting the amount of liquid in the torus.

The means for developing and maintaining the helical liquid flow on the inside rotor and stator surfaces as the rotor is rotated by the mechanical power source preferably comprises a plurality of rotor blades and a plurality of stator vanes. The plurality of rotor blades extend from the inside rotor surface into the passage toward the stator, and these rotor blades are spaced approximately equally around the inside rotor surface. The plurality of stator vanes extend from the inside stator surface into the passage toward the rotor, and these stator vanes are spaced approximately equally around the inside stator surface. The liquid flows between adjacent ones of the rotor blades and between adjacent ones of the stator vanes. The rotor accelerates the flow while the stator accepts liquid from the outlet side of the rotor blades and redirects it back into the inlet side of the rotor blades thus forming a closed loop and the unique helical flow.

In accordance with the invention, these blades and vanes are shaped to develop and maintain the helical recirculating liquid flow on the inside rotor and stator surfaces as the rotor is rotated by the mechanical power source, which flow results in the vaporization of at least some of the liquid and the collecting of the vapor within (i.e., at the core of) this swirling toroidal liquid flow. The vapor is substantially centrifugally separated from the liquid flow. Some of the preferred shapes, features, and functionality of the rotor blades and stator vanes are as follows.

The rotor blades and stator vanes preferably have turning angles that develop and maintain the helical liquid flow and that allow the flow to travel at a velocity sufficient to keep the flow on the inside rotor and stator surfaces and against the inside rotor surface.

The rotor blades and stator vanes preferably have turning angles that develop and maintain the helical liquid flow and that allow the flow to travel at a velocity sufficient to provide frictional dissipation, from fluid shear stresses at the torus and blade (or vane) surfaces, that matches the power input from torque on the rotor.

The rotor blades and stator vanes preferably turn the helix angle of the helical flow so that the change of angular momentum of the flow passing between the blades and the vanes develops an active torque on the rotor and a reaction torque on the stator, respectively, such that the power input from the rotor is approximately equal to the fluid dissipation in the helical flow caused by primarily viscous shear.

Each of the rotor blades and stator vanes preferably has a rake angle such that the surface of each blade or vane is approximately parallel, at each point along the flow path, to the absolute acceleration vector of fluid particles in the liquid stream that is passing between that blade or vane and the adjacent blade or vane, respectively.

Each of the rotor blades and stator vanes preferably has an inlet angle such that the leading edge of the blade or vane is approximately aligned with the angle at which the liquid flow approaches the blades or vanes, respectively.

Each of the rotor blades and stator vanes preferably is hydrodynamically streamlined in shape at its leading and trailing edges.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

A power absorbing dynamometer according to the invention functions by absorbing power through primarily viscous dissipation that results from a unique fluid flow. By utilizing the fluids latent heat of vaporization, and developing flow in an organized manner, power density and machine life has been dramatically increased. The power absorbed by the dynamometer is some function of rotor speed and the amount of liquid in the working compartment. The vapor or steam generated by the dynamometer as power is absorbed thereby can be vented straight to the atmosphere. This eliminates the need for bulky support equipment such as condensing equipment and/or external liquid cooling equipment.

The unique flow created by the power absorbing dynamometer can be visualized as a sheet of liquid that recirculates helically on the inside surface of a torus with a centrifugally self separating vapor core. The power absorbing dynamometer uses a unique rotor/stator configuration and blade/vane scheme to develop this swirling toroidal flow. Through a Lagrangian analysis, the rotor blade (and stator vane) rake angle has been determined, at each point along the flow path, that orients the blades (and vanes) parallel to the local acceleration vector. Consequently, the free surface of the liquid is approximately perpendicular to the blades (and vanes). Due to a large radial pressure gradient produced by a significant centrifugal field imparted on the highly twisted flow, boiling is confined to a thin layer of the liquid sheet near the free surface thereof, the vapor and the liquid are self separating, and cavitation erosion is minimized. The liquid that is boiled off is replaced by makeup feed water that is introduced into the dynamometer to maintain steady flow conditions.

Figure 1:
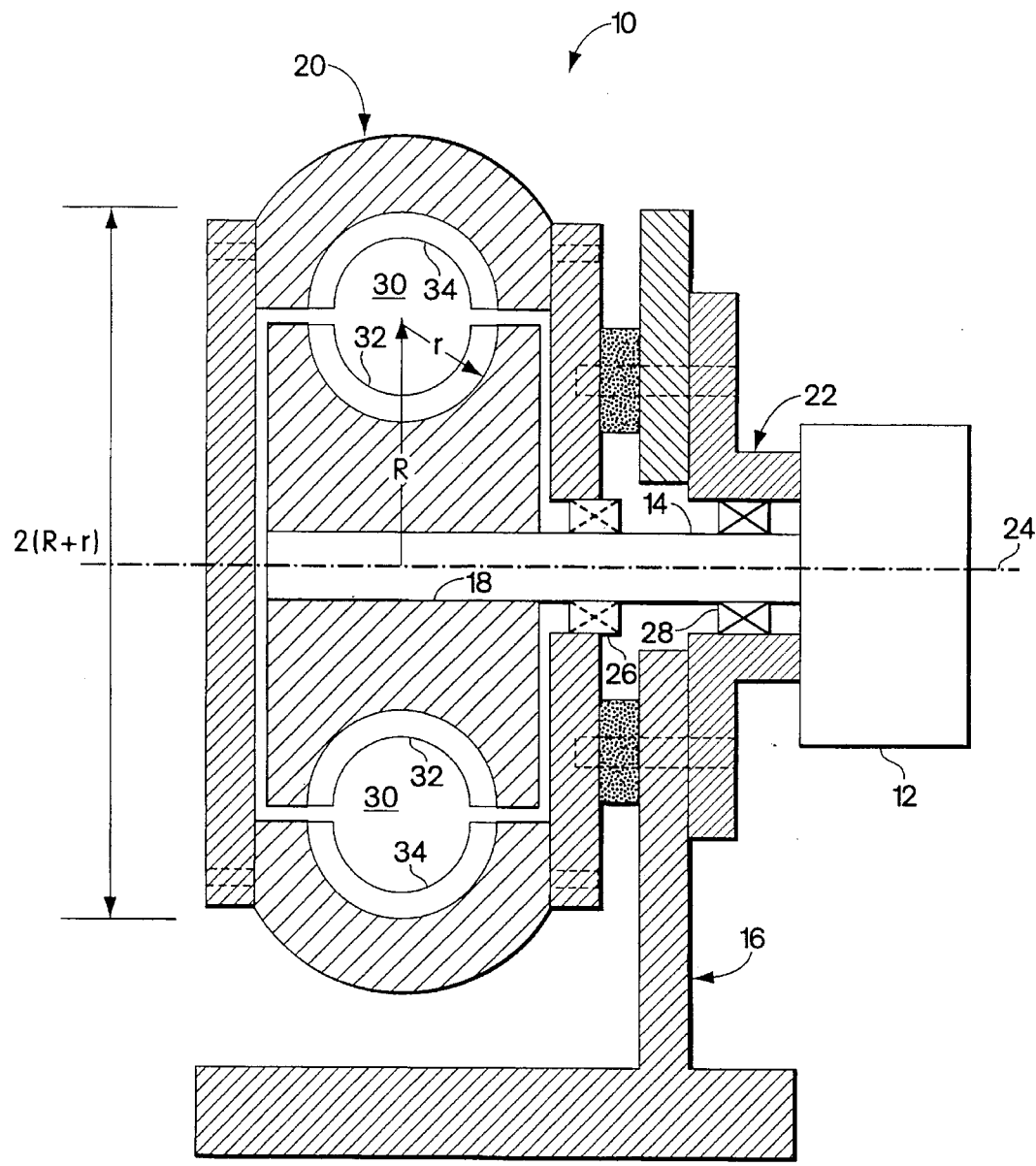
FIG. 1 is view in cross-section of an embodiment of a power absorbing dynamometer according to the invention.

Referring to FIG. 1, a system 10 for mounting and using an embodiment of a power absorbing dynamometer according to the invention to test (e.g., measure the output power of) an engine 12 includes a supporting stand structure 16 to which the engine 12 is bolted. A flange 22 couples the engine 12 to the supporting stand structure 16. The engine 12 has a driving shaft 14 which couples to and drives a rotatable rotor 18 of the power absorbing dynamometer. The system 10 typically has a shaft seal 26 and a bearing 28. The power absorbing dynamometer also includes a stationary stator 20 which is shown bolted to the supporting stand structure 16. The stator 20 remains stationary as the rotor 18 is driven by the shaft 14 of the engine 12. The rotor 18 rotates about an axis 24 passing through the center thereof, which axis 24 also passes through the center of the driving shaft 14.

The rotor 18 and stator 20 together define a torus-shaped passage 30 within the power absorbing dynamometer. This passage 30 is bounded substantially half by a curved inside rotor surface and substantially half by a curved inside stator surface, although it is possible to have other configurations where the inside rotor surface of the inside stator surface bounds more or less than half of the passage 30. The passage 30 preferably is a circular torus, although other shapes are possible such as elliptical, etc. Geometrically, a circular torus is formed by the rotation of a circle about an axis in the plane of the circle and not cutting the circle. The passage 30 (circular torus) is defined by a revolving circle of radius "r" and by a distance "R" measured from the center of the circle to the axis 24 of rotation. The distance "R" is referred to as the major radius of the torus, and the distance "r" is called the minor radius of the torus. The rotor 18 forms the inner part of the torus 30 (i.e., the region of the torus 30 inside the major radius "R"), and the stator 20 is the remainder of the torus 30.

A plurality of rotor blades 32 extend from the curved inside rotor surface into the passage 30, and a plurality of stator vanes 344 extend from the curved inside stator surface into the passage 30. These blades 32 and vanes 34 are shaped to develop and maintain within the passage 30 a substantially helical recirculating flow of a liquid on the inside rotor and stator surfaces as the rotor 18 is driven by the shaft 14. The flowing liquid is thereby heated or vaporized by primarily viscous dissipation. Power absorbed from the engine 12 is related to a rate at which the liquid is heated or vaporized. In accordance with the invention, at least some of the liquid in the passage 30 boils and vaporizes due substantially only to friction associated with the substantially helical recirculating flow of the liquid on the inside rotor and stator surfaces, and the power absorbed from the engine 12 is related to a rate at which the liquid vaporizes. The vaporized liquid collects substantially at the center of the passage 30 as the substantially helical recirculating flow of the liquid is maintained within the passage 30 on the inside rotor and stator surfaces. In some preferred embodiments, the liquid is water.

Figure 2:
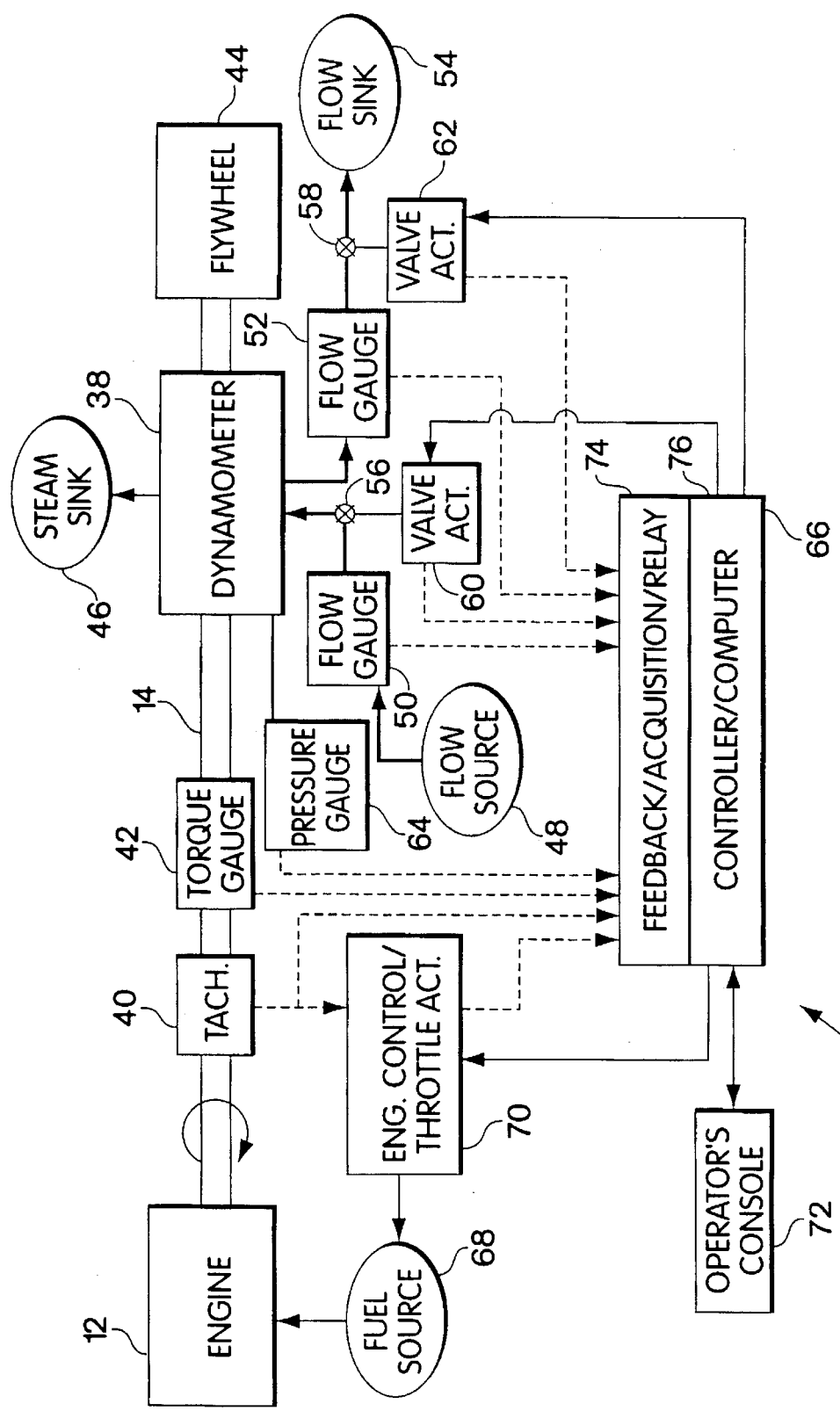
FIG. 2 is a functional block diagram of an engine test system including a power absorbing dynamometer according to the invention.

Referring to FIG. 2 (which is a functional representation not consistent with FIG. 1 physically), an engine test system 36 for measuring, storing, and displaying a variety of parameters associated with the engine 12 utilizes a power absorbing dynamometer 38 according to the invention. The system 36 includes a tachometer 40 and a torque gauge 42 coupled to the shaft 14. A flywheel 44 is placed at the distal end of the shaft 14, although it is possible to locate the flywheel 44 on the other side of the dynamometer 38. Steam, which results from the unique organized liquid flow developed and maintained by the dynamometer 38, can be sent to a steam sink 46 such as the atmosphere or steam collecting/utilizing equipment. Liquid (e.g., water) is fed into the passage 30 of the dynamometer 38 from a flow source 48. The flow of the liquid into the dynamometer 38 is monitored by an input flow gauge 50. If some or all of the liquid is drained from the passage 30 of the dynamometer 38, an output flow gauge 52 can monitor the draining liquid passing into a flow sink 54. Input and output flow valves 56, 58 are controlled by input and output valve actuators 60, 62 to feed and drain liquid to and from the dynamometer 38. The output flow valve 58 and the components related thereto are optional. A pressure gauge 64 also is connected to the dynamometer 38. A fuel source 68 can be provided for feeding fuel to the engine 12. This fuel source 68 can be under the control of an engine controller/throttle actuator 70.

The engine controller/throttle actuator 70, the tachometer 40, the torque gauge 42, the pressure gauge 64, the input and output flow gauges 50, 52, and the input and output valve actuators 60, 62 all are coupled to and generally communicate with a system control module 66. In general, this control module 66 receives signals from the various devices coupled thereto, processes the information contained in the signals, and outputs signals indicating action(s) to be taken by the engine controller/throttle actuator 70, the input valve actuator 60, and/or the output valve actuator 62. The control module 66 also communicates with an operator's console 72. Via the console 72, an operator can check on the system status and generally alter any aspect of the system 36. The control module 66 includes a feedback/acquisition relay portion 74 and a controller/computer portion 76.

Figure 3:
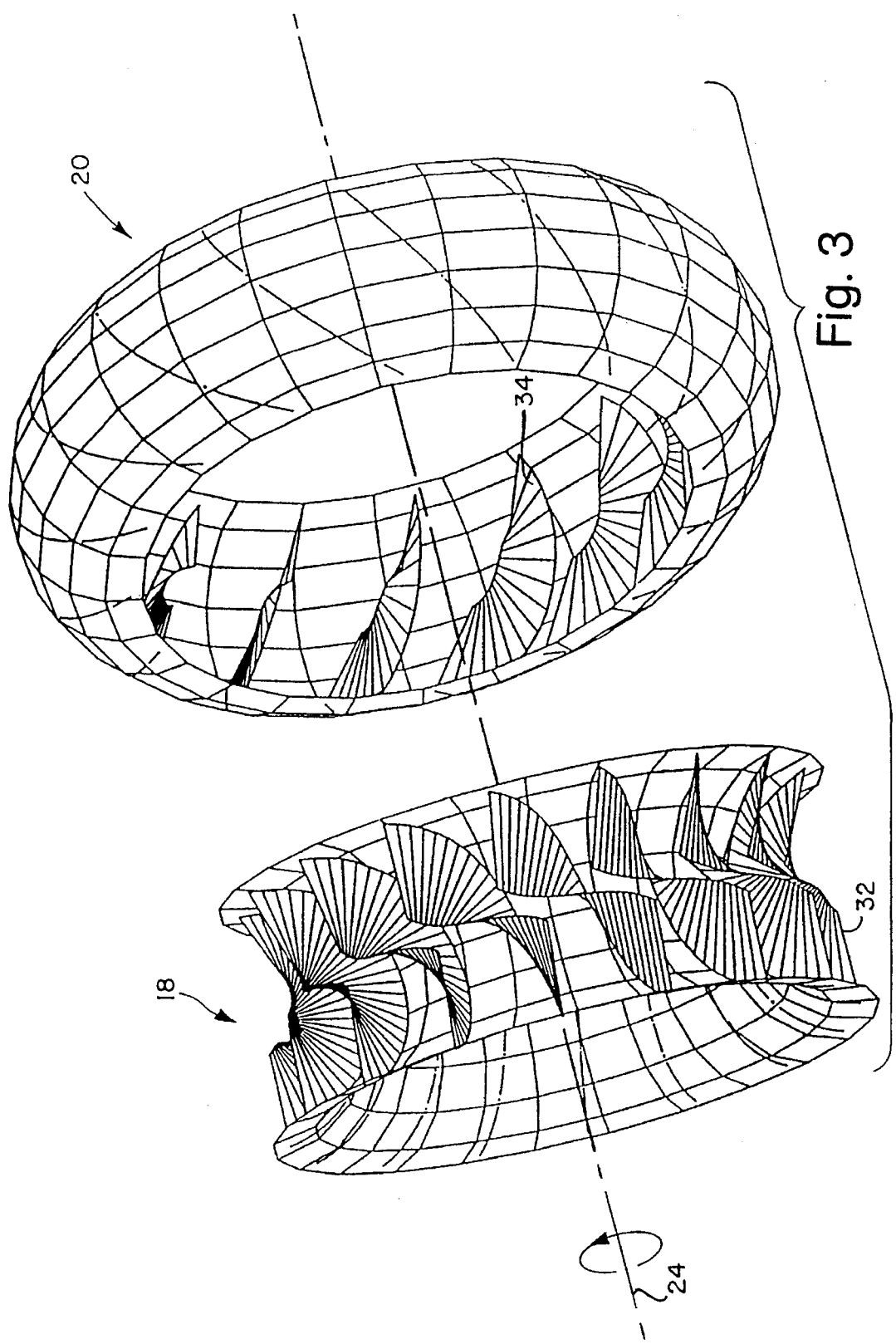
FIG. 3 is a perspective view of a rotor and a stator of a power absorbing dynamometer according to the invention with the rotor taken out of the stator to reveal the rotor blades and the stator vanes.

Referring to FIG. 3, the rotor 18 and the stator 20 of an embodiment of a power absorbing dynamometer according to the invention are shown separated from each other. By comparing FIGS. 1 and 3, the manner in which the rotor 18 and stator 20 fit together to form the torus-shaped passage 30 becomes clearer. From FIG. 3, it can also be seen that each of the plurality of rotor blades 32 and stator vanes 34 are twisted in shape. In general, each of the plurality of rotor blades 32 has the same twisted shape as every other rotor blade, each of the plurality of stator vanes 34 has the same twisted shape as every other stator vane, and the rotor blades 32 and stator vanes 34 have different shapes. Generally, the reason that the rotor blades 32 and stator vanes 34 have different shapes is because the stator remains stationary whereas the rotor rotates.

Figure 4:
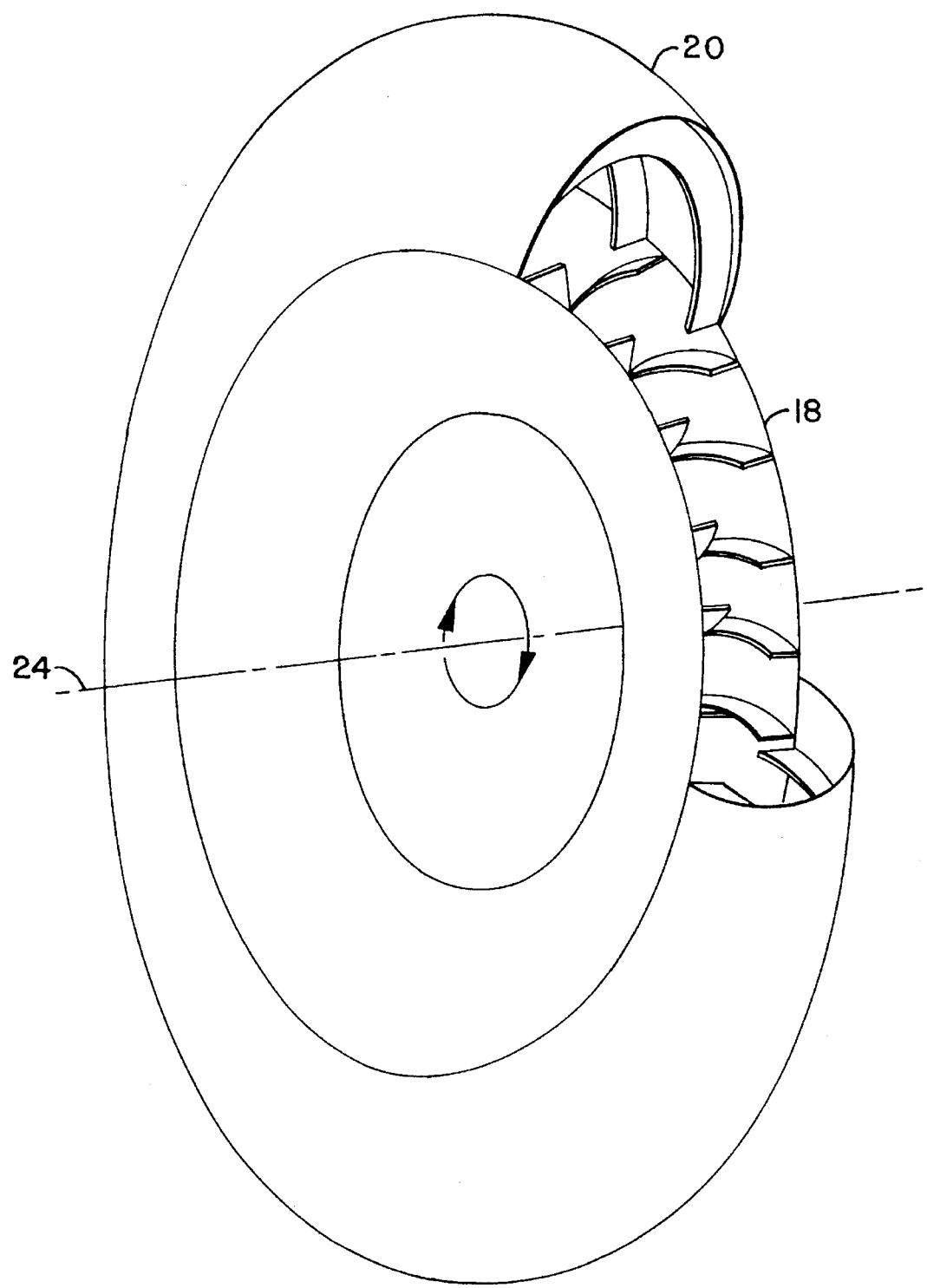
FIG. 4 is a diagram of a power absorbing dynamometer according to the invention with a portion of the stator broken away to reveal the rotor blades, the stator vanes, and the torus-shaped passage within the dynamometer defined by the rotor and stator.

Referring to FIGS. 3 and 4, the plurality of rotor blades 32 are spaced approximately equally around the curved inside rotor surface, and each of the plurality of rotor blades 32 forms a channel (for the liquid flow) with an adjacent one of the rotor blades 32 and the curved inside rotor surface. There is a rotor channel between any two rotor blades 32. The plurality of stator vanes 34 are spaced approximately equally around the curved inside stator surface, and each of the plurality of stator vanes 34 forms a channel (for the liquid flow) with an adjacent one of the stator vanes 34 and the curved inside stator surface. There is a stator channel between any two stator vanes 34.

Both the plurality of rotor blades 32 and the plurality of stator vanes 34 have an inlet side and an outlet side. Liquid flow that travels within and through a stator vane-defined channel in the stator 20 exits that stator channel at the outlet side of the stator vanes 34. That stator-exiting liquid flow then enters the inlet side of the rotor blades 32 and travels within and through a rotor blade-defined channel in the rotor 18, and the flow then exits that rotor channel at the outlet side of the rotor blades 32. That rotor-exiting liquid flow then enters the inlet side of the stator vanes 34 and travels within and through a stator vane-defined channel in the stator 20. The flow continues in this manner such that it helically swirls and recirculates within the passage 30 on the curved inside rotor and stator surfaces in accordance with the invention.

Both the rotor 18 and the stator 20 thus affect, develop, and maintain the substantially helical recirculating flow of the liquid on the inside rotor and stator surfaces as the rotor 18 is driven about the axis 24. The liquid in this flow circuit accelerates until the power dissipated by the liquid equals the power input by the rotor 18. The rotor torque input, (recirculating) mass flow rate, and power dissipation are all coupled to the geometric shape (profile) of the blades.

Figure 5:
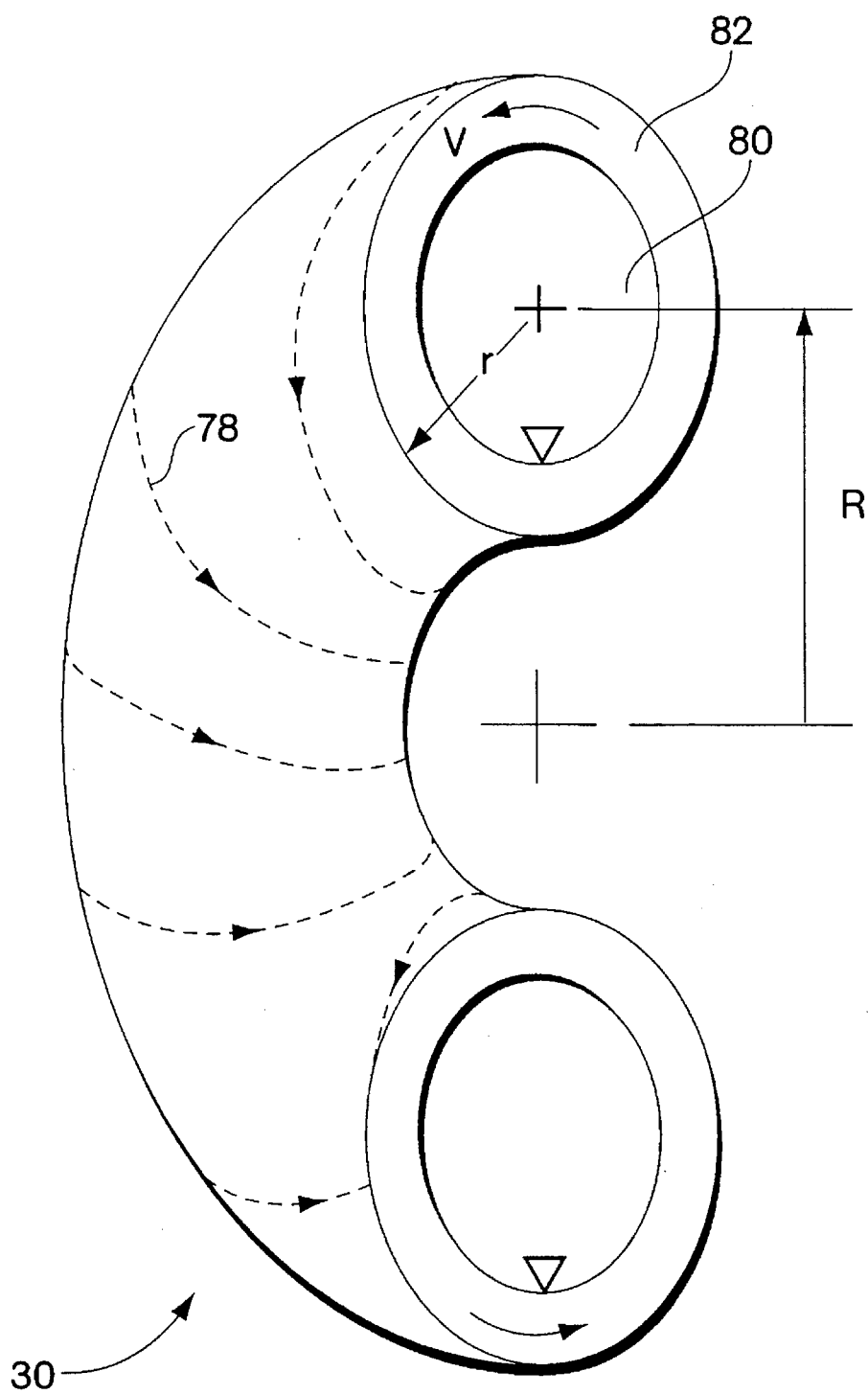
FIG. 5 is a portion of the torus-shaped passage within the power absorbing dynamometer showing a substantially helical recirculating liquid flow on the walls of the passage and a core where the vapor collects.

Referring to FIG. 5, the substantially helical recirculating liquid flow 78 according to the invention is shown in a simplified diagram in which the rotor/stator separation is not identified such that the torus-shaped passage 30 appears not to be formed by two stages (i.e., the outer stator and the inner rotor). The organized flow 78 can be visualized as a sheet of liquid that helically recirculates on the inside surface of the torus 30. This swirling toroidal flow 78 is held against the surface of the torus 30 by a strong centrifugal field, and hence large radial pressure gradient, that results from the streamline curvature of the liquid flow 78. Consequently, the fluid is stratified by density which results in a vapor core 80 that is surrounded by a liquid sheet 82. Ways of evacuating the vapor core 80 from, and feeding liquid into, the torus-shaped passage 30 are described hereinafter with reference to FIG. 7. The boiling which results from the power absorption is confined, due to the presence of this large radial pressure gradient, to a relatively thin layer of the liquid sheet 82 that is bounded on one side by the free surface of the liquid sheet 82. The power absorption is related to the amount of liquid in the torus, and thus the thickness of the liquid sheet 82.

Figure 6A:
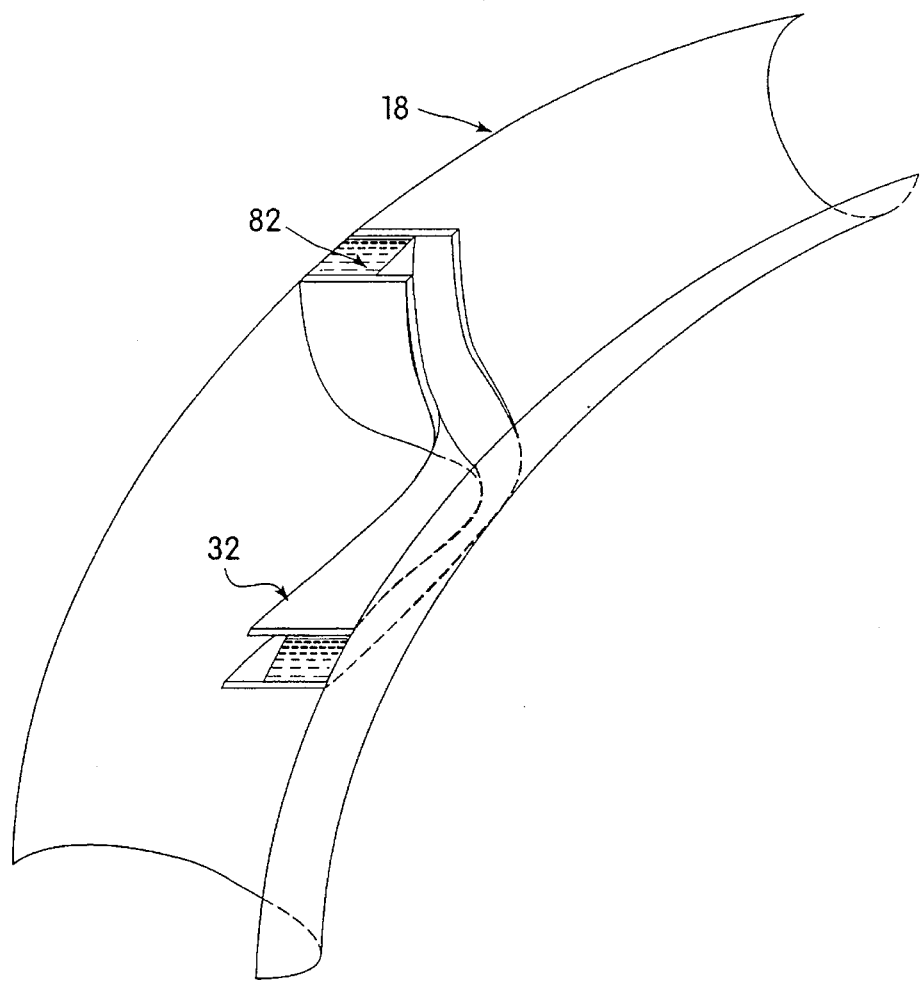
FIG. 6A is a diagram of a portion of the rotor showing only one pair of rotor blades and a liquid sheet flowing therebetween.
Figure 6B:
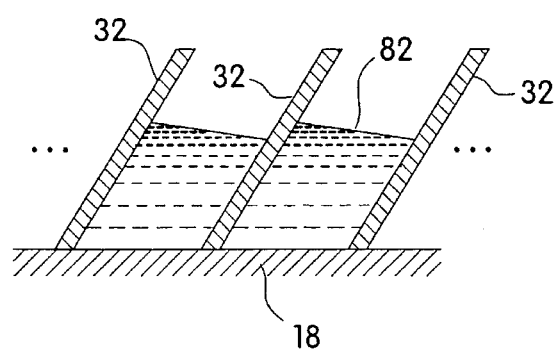
FIG. 6B is a view in cross-section of a section of the rotor (or stator) showing the approximately perpendicular orientation of the free surface of the liquid sheet with respect to the rotor blade (or stator vane) surface.

While only the rotor and its blades are shown in FIGS. 6A and 6B, it is to be understood that the same statements and principles (as discussed below with reference to FIGS. 6A and 6B) that apply to the rotor and its blades also apply to the stator and its vanes. Referring now to FIGS. 6A and 6B, the rotor blades 32 (or stator vanes 34) can be thought of as the side walls of channels in which the liquid flows. The appropriate profile (i.e., turning angle) and orientation (i.e., rake angle) of the rotor blades 32 (or stator vanes 34) are determinable from mass, momentum, and energy conservation, as well as the concept of geometric principle curvature. The rotor blade 32 (or stator vane 34) profile and orientation must be such that a recirculating helical liquid flow is developed that stays in the channels in accordance with the invention. Some of the preferred shapes, features, and functionality of the rotor blades and stator vanes are as follows.

The rotor blades and stator vanes preferably have turning angles that develop and maintain the helical liquid flow and that allow the flow to travel at a velocity sufficient to keep the flow on the inside rotor and stator surfaces and against the inside rotor surface. The rotor blades and stator vanes preferably have turning angles that develop and maintain the helical liquid flow and that allow the flow to travel at a velocity sufficient to provide frictional dissipation, from fluid shear stresses at the torus and rotor blade (or stator vane) surfaces, that matches the power input from torque on the rotor. The rotor blades and stator vanes preferably turn the helix angle of the helical flow so that the change of angular momentum of the flow passing between the blades and the vanes develops an active torque on the rotor and a reaction torque on the stator, respectively.

Each of the rotor blades and stator vanes preferably has a rake angle such that the surface of each blade or vane is approximately parallel to the absolute acceleration vector of fluid particles in the liquid stream that is passing between that blade or vane and the adjacent blade or vane, respectively. Each of the rotor blades and stator vanes preferably has an inlet angle such that the leading edge of the blade or vane is approximately aligned with the angle at which the liquid flow approaches the blades or vanes, respectively. Each of the rotor blades and stator vanes preferably is hydrodynamically streamlined in shape at its leading and trailing edges.

Referring to FIG. 6B, the free surface of the liquid sheet 82 is seen to be approximately perpendicular to the blade (or vane) walls, in accordance with the invention. For the stator vanes, this effect can be accomplished by orienting the vanes in the direction of principle curvature, which can be determined strictly from geometry. The rotor blades are more complicated due to the angular motion of the rotor, and therefore the rotor blades must be oriented parallel to the local total acceleration vector of the liquid.

Figure 6C:
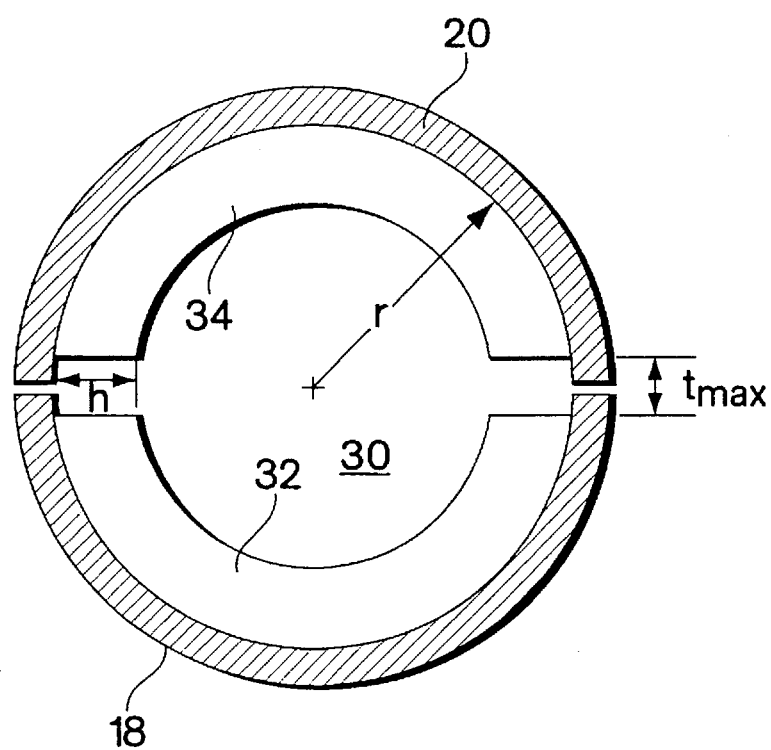
FIG. 6C is a view in cross-section similar to that of FIG. 1 but showing only a portion of an embodiment of a power absorbing dynamometer according to the invention.

Referring now to FIG. 6C, a preferred embodiment of a power absorbing dynamometer according to the invention has a major radius "R" of 2.5 inches, a minor radius "r" of 1.0 inches, a rotor blade and stator vane height "h" of 60% of the minor radius "r" (i.e., h=0.6 inches), a maximum blade and vane thickness "$t_{max}$" of 0.325 inches, sixteen rotor blades, and nineteen stator vanes. In general, to keep the amount of blade and vane twisting at an acceptable level, "h" should be no greater than 70% of the minor radius "r". Note that the distance indicated by $t_{max}$ in FIG. 6C is a distance which is approximately equal to the maximum blade thickness and the maximum vane thickness. The actual thickness cannot be seen from FIG. 6C. Blade and vane thickness ($t_{max}$) is described hereinafter with reference to FIGS. 8A and 8B. The capabilities of this preferred dynamometer are as follows.

The preferred dynamometer has been designed to meet the load requirements of a series of gas fueled turbo-shaft engines that are manufactured by Textron-Lycoming (namely the T55-L-712/714 series engines). The power output of these engines range from 2,000–5,000 hp, at rotor shaft speeds of 14,000–20,000 rpm. A typical steady operating load is approximately 3,500 hp at 16,000 rpm. Therefore, the dynamometer design point was selected to correspond to this load and rotor speed. A major dynamometer design task is to select a size and configuration that results in a machine that can accommodate the full power range (or operational envelope) of the engines to be tested. This usually requires iteration, but can generally be accomplished easily with the aid of the numerical programs and information previously presented. This was done, and the parameters that define the preferred dynamometer are listed below.

Major Radius (R): 2.5"

Minor Radius (r): 1.0"

Blade Height (h): 0.6"

Maximum Blade Thickness ($t_{max}$): 0.325"

Blade Packing (B. P.): 0.5517

Number of Rotor Blades: 16

Number of Stator Vanes: 19

Recirculation Factor (k): 1.2

Design Point Liquid Level (%-Fill): 58%

Surface Roughness (S): 600 micro-inch

Water fill conduits: 1 per rotor blade, 0.25" circular diameter

Steam Vent Area (A): 7.85 sq.in, 0.41 sq.in per stator vane

The make-up flow rate (or water supply) required at the design point is approximately 20 gallons per minute. At steady operation, the equivalent mass flow must exit the working compartment in the form of vapor (or steam). The steam vent area (A) was calculated using a technique presented hereinafter, which technique results in a core pressure that is roughly one atmosphere above the steam outlet manifold pressure (which is assumed to be near atmospheric). Therefore, the core pressure is approximately two atmospheres.

The pressure rise across the recirculating liquid flow varies depending on the particular point in the flow circuit, and has been estimated at three points of interest listed below:

Maximum torus shell pressure (hub region @ 16,000 rpm), $P_{max}$=150 atm

Figure 10:
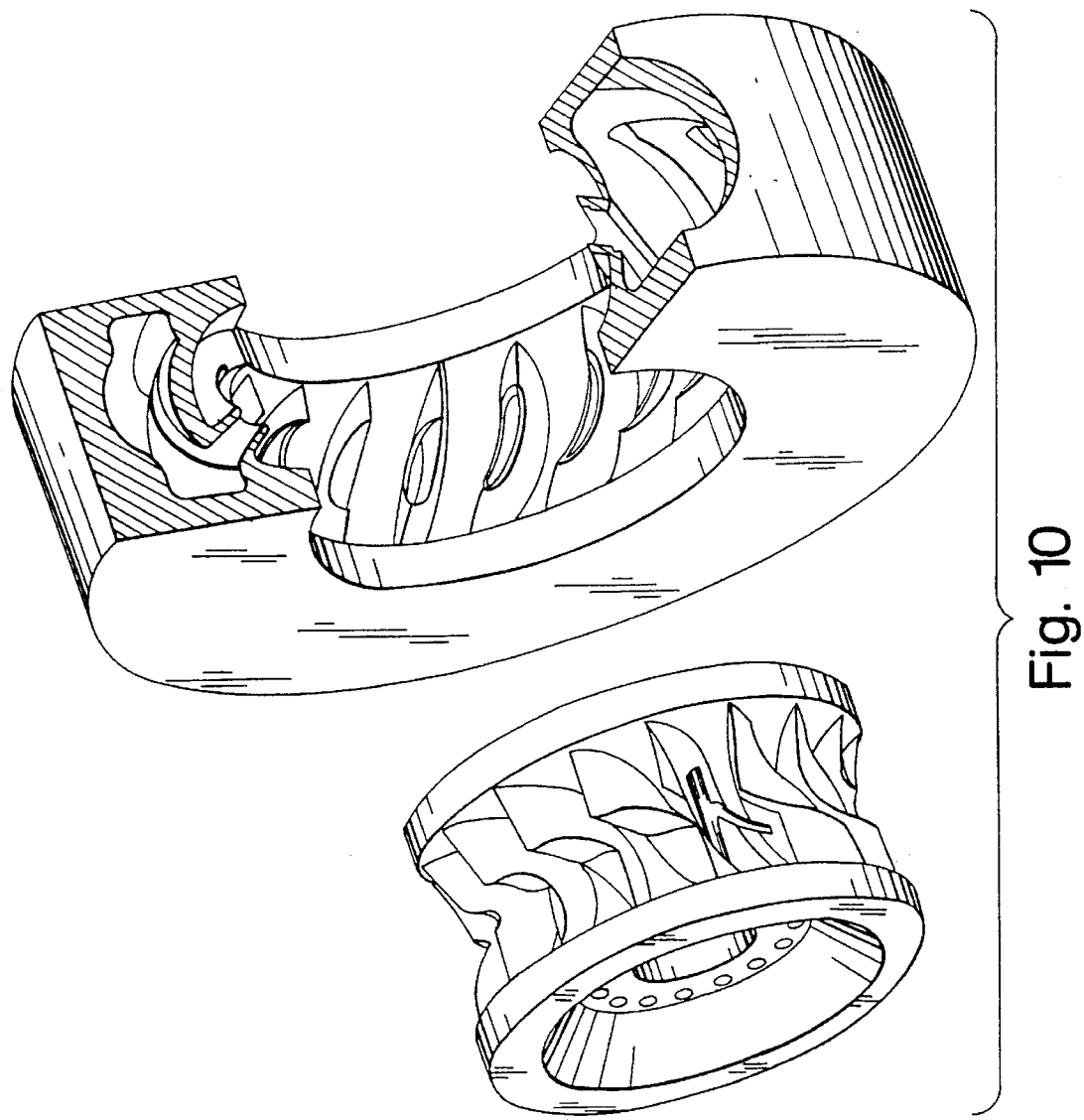
FIG. 10 is a CAD representation of a preferred power absorbing dynamometer according to the invention.

Rotor/Stator interface pressure (split pressure @ 16,000 rpm), $P_{split}$=75 atm Minimum torus shell pressure
(stator outside @ 16,000 rpm), $P_{min}$=45 atm FIG. 10 is a CAD representation of this preferred dynamometer. Large steam vents in the stator vanes are visible. Water fill conduits can also be seen in the rotor blades. The intended manufacturer of this dynamometer found this location of the fill conduits to be a reasonable location in terms of manufacturing requirements.

For this preferred dynamometer, flow modeling was used to make performance predictions which are shown below in Table 1.

tion. Therefore, the predicted performance map is improved based on the results of the low-speed experiment. The actual low-speed friction factors were 25% of the predicted values, and this was the primary reason that the actual power absorption was lower in the low-speed experiment than estimated. If the same behavior holds true for this preferred dynamometer, the observed power absorption will be proportionately less than predicted. The predicted power absorption for the preferred dynamometer thus can be corrected by multiplying the predicted value by the ratio of the observed to predicted low-speed friction factors ($f_{observed}/f_{predicted}$, equal to roughly 0.25). This correction makes it clear that the maximum power absorption at 16,000 rpm is just over 1,100 hp. If this corrected/modified estimated power is close to the actual power dissipation, the preferred dynamometer may be too small to meet the full operational requirements of the engines. This can be remedied by either adding three dynamometers, or increasing the size. Adjusting the size is the better option, since the scaling laws indicate that the power dissipation increases with the outside diameter raised to the fifth power. That is, instead of having several 7" outside diameter machines it is better to have one 9.4" outside diameter dynamometer that can absorb up to 5,000 hp at 16,000 rpm. Of course, these corrective measures would only need to be invoked if the observed friction factor is in fact 75% less than predicted, as in the low-speed experiment. It is believed that the true power dissipation lies somewhere between the corrected/modified estimate and the predicted absorption such that the numbers presented hereinbefore represent upper and lower limits for the true performance map.

Figure 7:
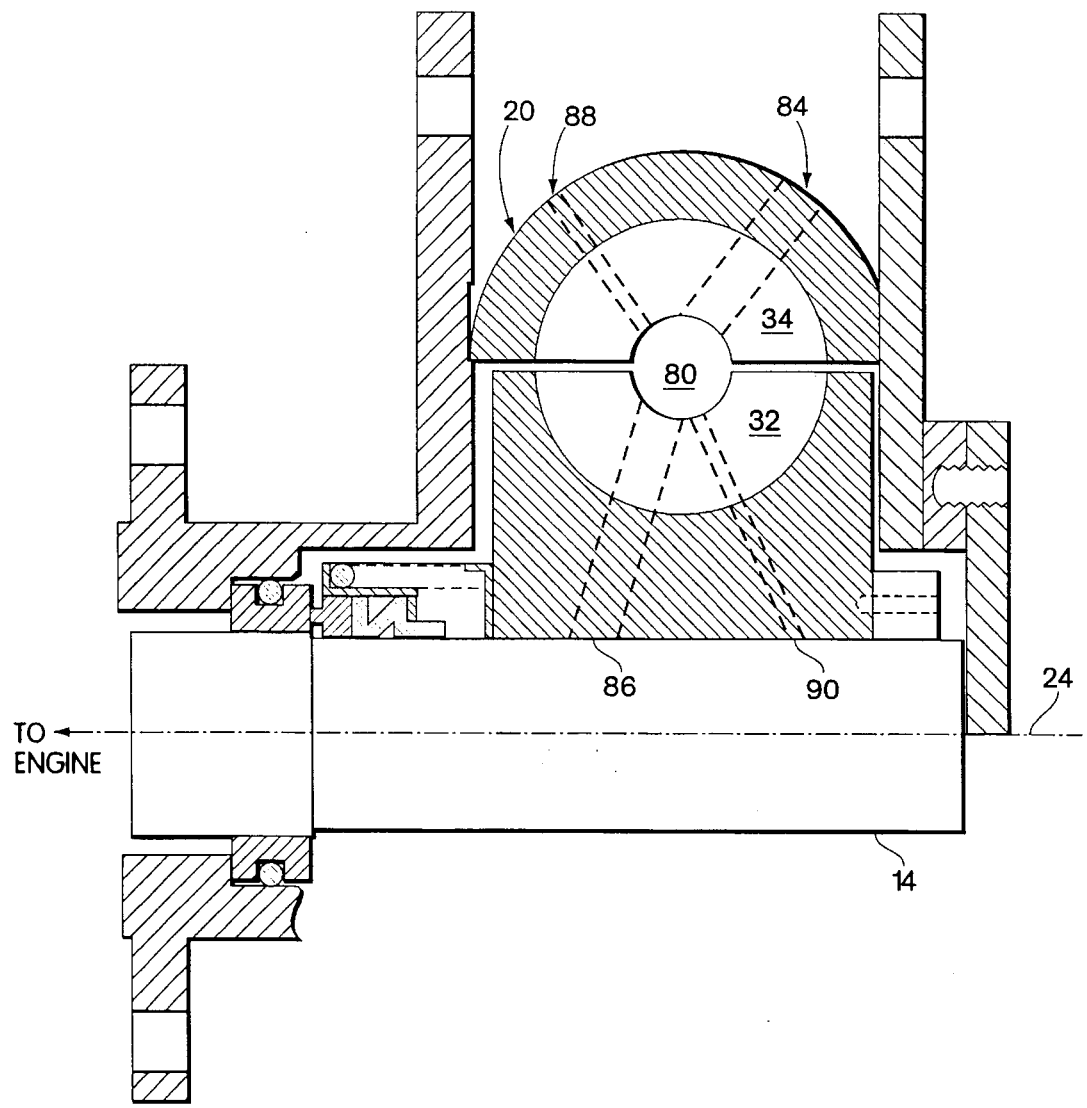
FIG. 7 is a view in cross-section of a portion of an embodiment of a power absorbing dynamometer according to the invention having liquid fill holes and vapor vent holes formed in the stator vanes and/or rotor blades.

As mentioned previously while referencing FIG. 5, FIG. 7 is useful for illustrating ways of evacuating the vapor core 80 from, and feeding liquid into, the torus-shaped passage 30. Referring to FIG. 7, in accordance with the invention, the vapor or steam preferably is evacuated or vented from the passage 30 via either a stator vent hole 84 formed through

TABLE 1

| | Numerically-generated data for preferred dynamometer | | | | | | | |
|---|---|---|---|---|---|---|---|---|
| | 25% | | 50% | | 75% | | 100% | |
| ω | P(hp) | k | P(hp) | k | P(hp) | k | P(hp) | k |
| 5,000 | p = 15 | 0.67 | 44.0 | 0.92 | 85 | 1.07 | 130 | 1.15 |
| 10,000 | p = 110 | 0.65 | 345 | 0.90 | 660 | 1.05 | 1010 | 1.12 |
| 15,000 | p = 375 | 0.64 | 1150 | 0.89 | 2200 | 1.04 | 3390 | 1.11 |
| 20,000 | p = 880 | 0.63 | 2700 | 0.88 | 5200 | 1.03 | 8000 | 1.10 |
| | f = 0.042 | | f = 0.039 | | f = 0.038 | | f = 0.038 | |

From the data in Table 1, the extremities of the performance envelope can be easily determined. The preferred dynamometer is predicted to be capable of absorbing 2,000 hp at 14,000 rpm and 80%-Fill, 4,200 hp at 16,000 rpm and 100%-Fill, and 5,000 hp at 20,000 rpm and 73%-Fill. Engine curves, or the operating envelope, can be superimposed over the preferred dynamometer performance map making it easy to identify the appropriate %-Fill for a particular engine set-point. Of course in an actual test scenario, fluid level selection and adjustment is best handled by a computer such as the control module 66 of FIG. 2.

The predicted performance map presented in Table 1 is optimistic in that certain inaccuracies are associated with the flow modeling technique used to make the predictions. The estimated friction factors are probably somewhat higher than actual (as was the case in a low-speed experiment performed by applicants) which has a direct impact on power absorpthe stator 20 and one of the stator vanes 34 or a rotor vent hole 86 formed through the rotor 18 and one of the rotor blades 32. In the stator vent hole embodiment, it is possible that more than one (e.g., all) of the stator vanes 34 has a stator vent hole formed therethrough for evacuating the vapor from the core 80. Similarly, in the rotor vent hole embodiment, it is possible that more than one (e.g., all) of the rotor blades 32 has a rotor vent hole formed therethrough for evacuating the vapor from the core 80. Also in accordance with the invention, the liquid preferably is introduced or fed into the passage 30 via either a stator fill hole 88 formed through the stator 20 and one of the stator vanes 34 or a rotor fill hole 90 formed through the rotor 18 and one of the rotor blades 32. Again, in the stator fill hole embodiment, it is possible that more than one (e.g., all) of the stator vanes 34 has a stator fill hole formed therethrough for feeding the liquid into the passage 30, and in the rotor fill hole embodiment, it is possible that more than one (e.g., all) of the rotor blades 32 has a rotor fill hole formed therethrough for feeding the liquid into the passage 30.

A power absorbing dynamometer according to the invention introduces enough of the liquid into the torus-shaped working compartment (i.e., the passage 30) to fill partially the passage 30 with the liquid. The amount of liquid in the passage 30 is related to the power absorbed from the engine driving he rotor. The power absorption at a particular rotor speed can be varied by adjusting the amount of liquid in the torus 30. That is, with the speed of the engine set, the only way to vary the torque or load is to change the amount of liquid in the passage 30 of the dynamometer. The amount of liquid in the passage can be adjusted by controlling the mass flow rate of the liquid feeding the passage. The dynamometer torque can also be varied by changing the rotor speed while keeping the amount of liquid in the dynamometer's passage constant.

Figure 8A:
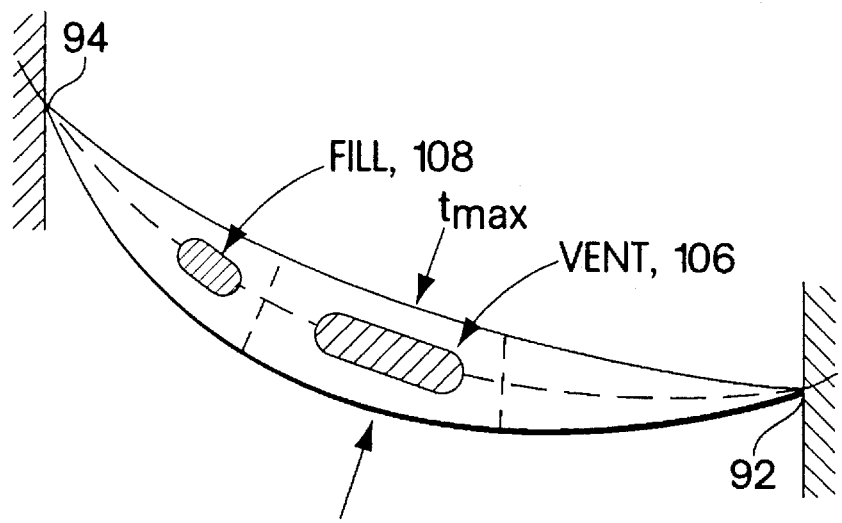
FIG. 8A is a top view of a rotor blade (or stator vane) showing liquid fill and vapor vent holes.
Figure 8B:
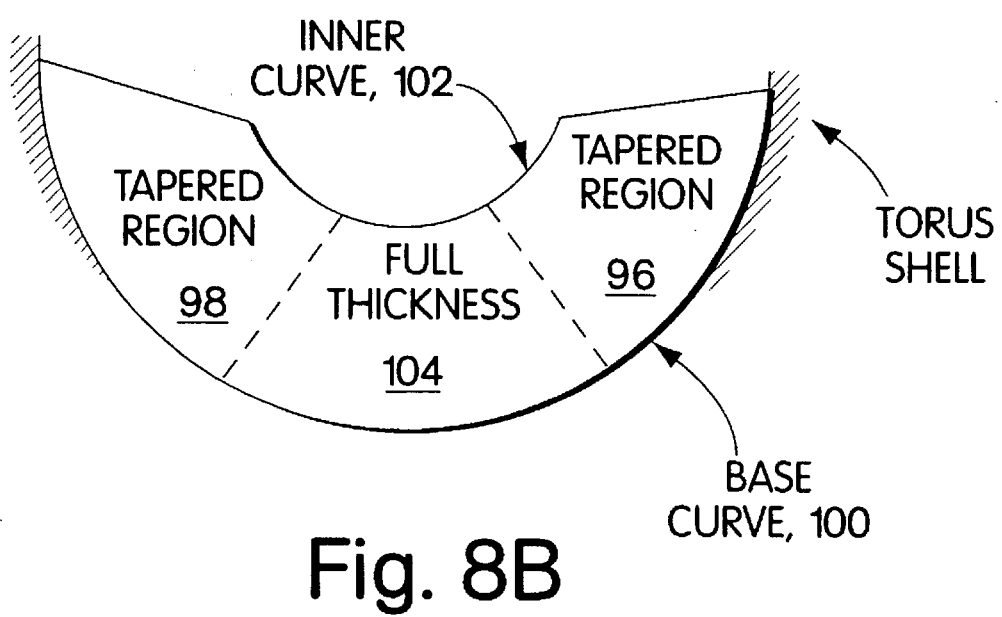
FIG. 8B is a side view of a rotor blade (or stator vane) showing tapering of the blade (or vane) shape.
Figure 9A:
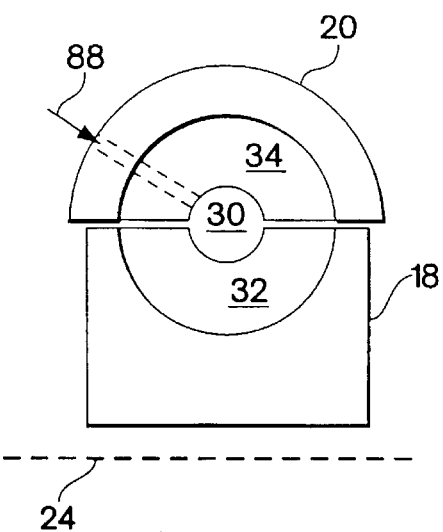
FIGS. 9A and 9B are views in cross-section of a portion of a power absorbing dynamometer having liquid fill hole(s) formed in the stator vanes.
Figure 9B:
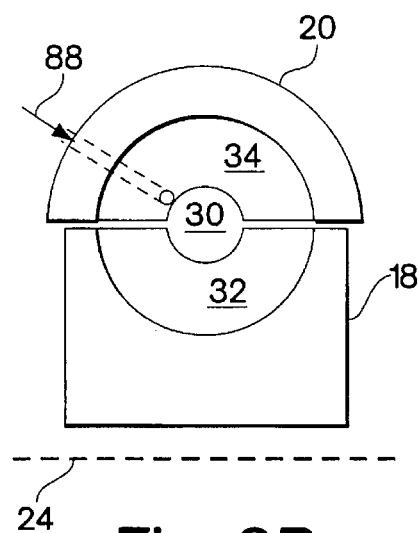
Figure 9C:
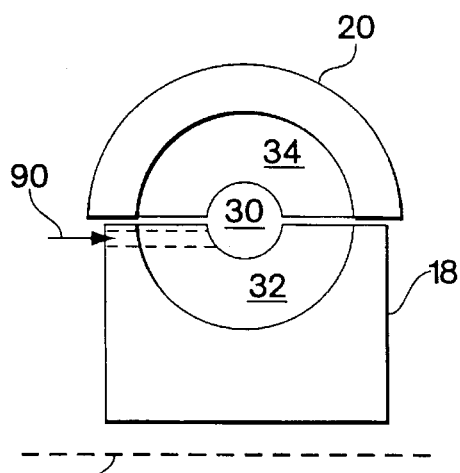
FIGS. 9C and 9D are views in cross-section of a portion of a power absorbing dynamometer having liquid fill hole(s) formed in the rotor blades.
Figure 9D:
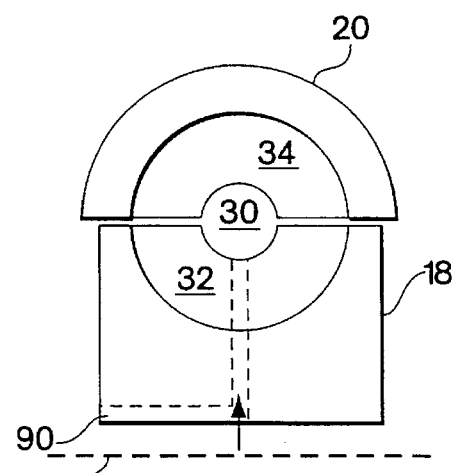

While the views in FIGS. 6A and 6B might give the impression that the rotor blades (and stator vanes) have a constant thickness along the entire channel length, the blades (and vanes) preferably have a tapered solid body shape that makes them fluid dynamically acceptable, functional, and mechanically rigid enough to withstand large dynamic loading and centrifugal forces. Referring now to FIGS. 8A and 8B, the blades (and vanes) preferably are relatively thick, but with sharp leading and trailing edges 92, 94. This can be accomplishing by tapering the first and last thirds 96, 98 of the blades (measured relative to both the base and inner blade/vane curves 100, 102) from a maximum thickness section 104 to a sharp edge on either side 92, 94. Holes can be bored through the blades (or vanes) and used for steam ventilation 106 and feed/make-up water supply 108. Recall that a vapor core 80 is set-up inside the torus 30 and is surrounded by the helically recirculating liquid flow. The vapor or steam can be effectively removed by boring a hole 106 in one or more of the blades (or vanes), thus tapping into this vapor core 80.

Exact calculation of the appropriate area of these vent holes 108 is somewhat complex. However, one way to approximately determine the ventilation area "A" is by modeling the process as a compressible ideal gas flow through an orifice. This can be done by iteratively solving $$P_{core} = \frac{m}{A} \sqrt{\frac{R_s T_{core}}{C}}$$

where "C" is a constant that can be evaluated with $$C = \sqrt{\gamma \left(\frac{2}{\gamma+1}\right)^{(\gamma+1)/(\gamma-1)}},$$

$R_s$ and $\gamma$ are properties of the steam, and m is the steam mass flow rate. For a solution, the stagnation temperature in the core ($T_{core}$) must correspond to the stagnation core pressure ($P_{core}$) which is equal to the saturation pressure of the steam in the torus at this temperature. Clearly, for a fixed ventilation area the only way to increase the mass flow rate is to increase the stagnation core pressure. Of course, as the core pressure increases the liquid temperature also increases, which unfortunately increases the propensity for mechanical erosion.

In addition to providing vapor ventilation the blades (or vanes) preferably pump liquid into the torus-shaped passage 30 of the dynamometer. Since the pressure rise across the liquid sheet is quite high, it makes sense to inject liquid directly into the center of the torus 30 where the pressure is minimal. Liquid can be fed in through the blades (or vanes) in a number of different ways. FIGS. 9A–9D show a few possible feed water conduit design schemes. The scheme represented in FIG. 9A generally will encounter no complications due to rotating parts. The schemes represented in FIGS. 9C and 9D require rotating seals to feed water in through the rotor. The fill conduit dimensions can be easily calculated from basic fluid mechanics, and thus are not discussed here.

Further details of the invention follow.

Shear Stress Induced Power Dissipation:

Power is dissipated in the working fluid of the dynamometer. Enough power is dissipated so that the dynamometer has a high power density. Shear stress is a dissipation mechanism that can be generated in an organized (not very destructive) flow and can absorb significant amounts of power.

As the rotor speed increases the recirculation velocity (which is approximately normal to the blade or vane rotational velocity) must also increase. At some point, the skin friction induced dissipation becomes significant and effective as a power absorber. This is discussed below, as well as the conditions that are required to produce significant frictional dissipation.

The viscous losses in the recirculating liquid sheet can be estimated by calculating the skin friction drag acting on the wetted surface of the flow circuit. The drag force D can be written as follows, where ρ is the liquid density, $A_s$ is the wetted or shear surface area, $C_D$ is the average drag coefficient, and V is the (recirculating) liquid stream velocity:

$$D = \frac{1}{2} \rho A_s C_D V^2 = \frac{1}{2} \rho A_s C_D (kU)^2.$$

The power dissipated by friction is simply the drag force D multiplied by the recirculation velocity V. The recirculation velocity can be expressed as a factor (k) times the rotor blade meridian speed (Rω), where R is the meridian radius.

A high speed flow can be developed in a practical and controllable way such that the flow is capable of absorbing substantial amounts of power through shear induced dissipation while blade/vane incidence losses and cavitation erosion are minimized. The dynamometer blades and vanes are shaped in a way that produces a recirculating liquid flow in which shear stress induced friction is the primary power absorption mechanism.

Flow Model:

A flow model has been developed for the toroidal recirculating flow dynamometer based on the shear induced dissipation mechanism according to the invention. The flow field in the toroidal dynamometer is clearly very complex and it would be extremely difficult to precisely model the centrifugally accelerated, helically swirling, two-phase free surface flow. A basic model has been developed that embodies the fundamental characteristics of the flow and that can be used to make performance estimates.

There are several important features that must be included in the model. Clearly, the speed of the flow (or Reynolds number) is important, as well as how the flow is accelerated to a steady operating speed. The volume of liquid recirculating around on the inside surface of the dynamometer's working compartment is also important. Furthermore, estimating friction factors for the flow is crucial for both determining the speed of the flow and predicting power absorption. This requires that the effects of streamline curvature, due to the toroidal geometry, be incorporated. Also, determination of the appropriate wetted surface area is important.

Recall that the torus is divided into two sections, a rotor and a stator, which form a closed flow circuit. The liquid in the rotor stage is accelerated by the action of the rotor. The liquid flows from the rotor stage into the inlet of the stator stage and proceeds through the stator exiting into the inlet of the rotor, thus completing a flow circuit. The liquid accelerates, uni-directionally, until a steady state speed is reached at which point the power input from the rotor equals the shear stress induced dissipation in the recirculating liquid. As power is absorbed part of the recirculating liquid undergoes a phase transition. To maintain steady operation, make-up liquid must continually enter the dynamometer at the same mass flow rate that vapor is exiting. As a consequence of the strong centrifugal field, the liquid and vapor self separate, and a liquid sheet is formed on the surface of the torus. The liquid phase portion of the fluid is much denser than vapor and is by far the most significant part of the flow. Therefore, the model is built on the concept of a recirculating liquid sheet that dissipates power at a rate equal to the rotor input.

To accomplish this power balance, the rotor blades and stator vanes must affect the liquid by having the appropriate turning angles ($\beta$) such that the steady state speed (V) of the (recirculating) fluid sheet is related to the rotor blade speed (U). This relation can be defined as simply a factor k times U. Then, by design, the change in tangential velocity between rotor inlet and outlet is equal to U. The turning angle of the blades and vanes ($\beta$) is related to the recirculation factor (k) as shown by $$\beta = \tan^{-1}\left(\frac{U}{V}\right) = \tan^{-1}\left(\frac{1}{k}\right).$$

Since the flow path is closed on itself, a fixed turning angle (and hence recirculation factor) can be determined such that the velocity triangles remain approximately similar over a wide range of rotor speeds. The objective here was to design the blades and vanes such that the fluid exits the stator vanes at the correct rotor blade inlet angle and similarly exits the rotor stage at the correct stator inlet angle. In other words, the correct turning angle for both rotor blades and stator vanes is equal to $\beta$ as defined above. Clearly, the mass flow rate recirculating around in the torus, as well as the momentum and energy exchange between the rotor and liquid, must all be related to (among other things) the recirculation factor (k). These relationships are developed in the following section.

Power Balance Between Rotor Input and Recirculating Fluid:

The liquid in the torus is accelerated up to a steady state speed at which point the power dissipated by the recirculating fluid, neglecting other loss mechanisms, equals the rotor power input. The liquid flow is modeled as a pseudo one-dimensional flow, with the effects of the highly twisted streamlines and toroidal geometry included. The blades and vanes form channels in which the flow recirculates around on the inside surface of the torus. The recirculating mass flow rate, torque retarding the rotor, and thus power absorption rate, are all tied to the recirculation factor (k) of the liquid in the channels.

The active torque of the fluid acting on the rotor can be determined from elementary turbomachine analysis, and can be expressed as $$T = m(\Delta V_t)R.$$

Due to the closed toroidal flow circuit, the mass flowing through the rotor stage is equal to the recirculation mass flow rate which can be expressed in terms of the blade cross sectional area ($A_f$), recirculation factor, and rotor blade speed (U), as in $$m = \rho A_f(kU).$$

Furthermore, the area ($A_f$) is equal to the product of the number of blades (N), the blade spacing (s), and the liquid sheet thickness or wetted blade height ($h_w$). The change in tangential velocity is simply equal to the rotor blade speed, and the radius at which the flow enters and exits the rotor is the torus major radius (R). Thus, the equation for the torque of the fluid acting on the rotor can be re-written as follows, where the term in parenthesis is the recirculating mass flow rate:

$$T = (\rho N A_f kU)UR \equiv (\rho N s h_w kU)UR.$$

The torque times the rotor speed ($\omega$) is the power input to the fluid through the rotor ($P_{rotor}$), which can be expressed in terms of the machine parameters defined above by $$P_{rotor} = T\omega \equiv (\rho N s h_w kU)UR\omega.$$

Since the rotor speed ($\omega$) is simply the blade speed (U) divided by the major radius (R), the previous equation can be expressed more succinctly as $$P_{rotor} = T\omega \equiv (\rho N s h_w kU)UR\left(\frac{U}{R}\right) = \rho N s h_w k U^3.$$

At steady state, the rotor power input must be equal to the power dissipated by the fluid, which is the drag force ($F_d$) times the flow speed (V), neglecting other losses. The flow speed is (approximately) the recirculation factor times the blade speed, so the absorbed power can be written in terms of these parameters, and a friction factor ($C_d$) and wetted surface area ($A_s$), as:

$$P_{dissipated} = F_d V = \left(\frac{1}{2}\rho C_d A_s V^2\right)V \cong \frac{1}{2}\rho C_d A_s(kU)^3.$$

The wetted surface area is simply the product of the total fluid path length through the rotor and stator stages, the number of blades, and the wetted perimeter of the channels. However, the dimensions of the channel change as the fluid travels around the flow circuit due to the toroidal geometry. Therefore, the flow circuit must be broken down into (n) sub-sections, with the wetted surface area ($A_i$) and friction factor ($f_i$) individually evaluated for each sub-section. Incorporating this into the previous equation yields the following as an expression for the absorbed power:

$$P_{dissipated} \cong \frac{1}{2}\rho(kU)^3 \sum_{i=1}^{n} f_i A_i.$$

The steady state power absorbed by the dynamometer is defined by this equation, and the steady state power absorbed must equal the power input by the rotor ($P_{rotor}$). Canceling terms reduces the above equality to a simpler form:

$$N s h_w \cong \frac{1}{2}k^2 \sum_{i=1}^{n} f_i A_i.$$

The fluid recirculation factor (k) that balances the equation can be determined from this equation. However, the local friction factor ($f_i$) is a function of (among other parameters) the recirculation factor which makes the equation non-linear.

Therefore, the above equation is best solved iteratively using a computer.

Blade/Vane Generation:

The rotor and stator turning angles are defined by the recirculation factor, which is determined from the power balance developed hereinbefore. Blade and vane profiles having the correct turning angles were then determined. Note that the term "blade" as used in this and the next two sections generally means rotor blade and/or stator vane. These profiles define the base of the rotor and stator blades, and will thus be referred to as Base curves. This was broken down into two steps. First, a reasonable 2-D curve was selected that can make the liquid flow in an organized manner through the correct turning angle. This 2-D curve is called a Trace curve, which would exactly define the profile if the flow was planar. Since the flow is three dimensional, the Trace curves must be transformed into the appropriate coordinates. Therefore, the second step was to transform the Trace curve into cylindrical, and ultimately toroidal, coordinates which define the rotor and stator Base curves that lay on the surface of a torus. Then, an Inner curve was developed that together with the Base curve (i.e., connected by a surface) define the centerline (or centersurface) of the blades.

The blades must be oriented in a way that keeps the liquid in the channels. That is, the blades must have the correct rake angle at each point along the flow path to keep the free surface of the liquid perpendicular to the blades, just as a roller coaster track must be banked properly to keep the car's normal force perpendicular to the track. For the stator, this is done by determining the direction of principle curvature, at each point along the flow path, and orienting the blades in this direction. The rotor blades are more complicated because of the acceleration terms associated with the rotor's rotation. Therefore, the rotor blades are oriented parallel to the total acceleration vector, instead of in the direction of principle curvature. The result is the same in that the free surface of the liquid in the channels is kept approximately perpendicular to blades as the fluid turns through the prescribed angle.

Base curve Development:

Any planar curve that guides the liquid flow through the correct turning angle ($\beta$) chosen as the Trace curve and defined in terms of $Z_o$ and S coordinates (where $Z_o$ and S are dummy variables to be eliminated by transformations). Since this is a planar curve the rotor and stator Trace curves are the same except that they are complimentary or 180° reversed. To start with, consider a circle of radius (a) centered at the origin as described by:

$$Z_o^2 + S^2 = a^2.$$

The Trace curve can be defined as a segment of the circle that produces the correct turning angle. To get the correct turning angle, consider another variable Z whose axis is parallel to the $Z_o$-axis. The Z-axis is positioned a distance (L) to the right of the origin such that the angle between the line tangent to the circle (at the intersection point) and the Z-axis is equal to $\beta$ (the turning angle). The parameters needed to describe the Trace curve can be computed from the above equation and the following expressions, where (r) is the radius of a cylinder that corresponds to the minor radius of the torus, which define the dynamometer's working compartment:

$S_{max} = \pi r$, $\alpha = S_{max}/\sin(\beta), (\beta)$, and $L = \alpha(\cos \beta)$.

Next, the Trace curve is transformed into cylindrical coordinates such that it lays on the surface of a half cylinder. The transformation equations needed to accomplish this are as follows, where X, Y, and Z are the Cartesian coordinates of a point that lays on the cylindrically transformed Trace curve:

$$S = \zeta r,$$

$$X = r(1 - \cos\zeta),$$

$$Y = r(\sin\zeta), \text{ and}$$

$$Z = \sqrt{a^2 - s^2} - L.$$

These equations have one independent variable, and it is the angle between the cylinder's center to the Y point of interest and the X-axis (in the X-Y plane). These equations can be used for either the rotor or stator.

The next step is to transform the Trace curve from cylindrical to toroidal coordinates. This transformation can be thought of as wrapping the cylinder to an extent such that the center of curvature is the center of the torus. The radius from the center of the torus (R') and angle ($\alpha$) can be expressed in terms of the cylindrical variables Y and Z as follows, where (R) is the torus major radius:

$$R' = R - Y \text{ and}$$

$$\alpha = \tan^{-1}\left(\frac{Z}{R'}\right).$$

Then, the equations needed to transform the cylindrical Trace curve to toroidal coordinates, which define the Base curve, are straight forward and are written below where Y and Z (to calculate $\alpha$) are used as the independent variables:

$X' = X,$ $Y' = Y + R'(1 - \cos\alpha)$, and $Z' = R'(\sin\alpha).$

Now the blade Base profile (which lays on the surface of the torus) can be defined in terms of the Cartesian coordinates X', Y', and Z' using the five previous equations. These equations are for the rotor, but it is a trivial matter to adjust them for the stator, and therefore this adjustment is not presented here.

Inner Curve

The third part of blade generation was the development of the Inner curves which when joined by a surface to the Base curve form the centerline (or center-surface) of the blade. As aforementioned, the blades form channels in which the liquid flows. Therefore, the blades must be developed in such a way that they are perpendicular to the free surface of the liquid. For the stator this can be done by orienting the blades in the direction of principle curvature, which can be determined strictly from geometry. However, the rotor blades are more complicated due to the angular motion of the rotor, and therefore must be oriented parallel to the local total acceleration vector.

Stator blade generation is developed first since it requires only knowledge of the geometry. The method developed uses differential vector calculus, so the first step is to discretize the Base curve. Next, the discretized Base curve is put into vector notation (V) referenced to a local origin. A directional vector (d), from point to point on the Base curve, is determined that corresponds to the flow direction.

The directional vector is simply the vector difference between any two successive Base curve vectors, and it can be computed as follows where the subscripts indicate a particular vector:

$$\vec{d}_j = \vec{v}_{i+1} - \vec{v}_i.$$

From this, the local unit direction vector ($\vec{D}_u$) can be determined at each point along the Base curve, and then used to calculate a local curvature vector ($\vec{c}$):

$$\vec{c}_k = \vec{D}u_{j+1} - \vec{D}u_j.$$

The local unit curvature vector ($\vec{C}_u$) can now be calculated and then used to determine the location of the points that comprise the inner curve (where $\vec{I}$ is relative to the same previously defined origin), which together with the Base curve define a stator blade that is oriented in the direction of principle curvature at every point along the flow path in the stator stage.

$$\vec{I} = \vec{v} + h \cdot \vec{C}_u$$

The correct multiplier (h) in the above equation is the height of the stator blade.

The rotor blade Inner curve generation scheme is the same as the stator up to initial equation in this section. Then, instead of computing the direction of principle curvature, the local total acceleration vector must be determined. This requires a Lagrangian analysis of a fluid particle traveling along the rotor Base curve. The velocity of a fluid particle in the rotor stage can be written in the following vector form, where $\vec{V}$ is the absolute velocity, $\vec{W}$ is the relative velocity, and $\vec{U}(r_o)$ is the blade tangential velocity which is a function of $r_o$ (the radius from the center of rotation to any particular point on the base curve):

$$\vec{V} = \vec{W} + \vec{U}(r_o).$$

The relative velocity is approximately equal to the recirculation velocity which can be written as follows, where $\omega$ is the rotor angular speed and $\vec{U}(R)$ is the blade tip speed at $r_o = R$ (where R is the torus major radius):

$$\vec{W} = \vec{D}_u |\vec{W}| \equiv \vec{D}_u |k\vec{U}(R)| = \vec{D}_u(kR\omega)$$

The local blade speed can be calculated using the radius ($r_o$) where ($\vec{i}_o$) is a unit vector in the direction of rotation:

$$\vec{U}(r_o) = \vec{i}_o(r_o\omega).$$

Next, the absolute velocity vector can be decomposed into a magnitude ($V_m$) and unit vector ($\vec{V}_u$), and the Substantial derivative taken to determine the total acceleration vector at each point along the Base curve:

$$\vec{A} = \frac{D}{Dt}\vec{V} = \frac{D}{Dt}(V_m \cdot \vec{V}_u) = \left(\frac{dV_m}{dt}\right)\vec{V}_u + V_m\left(\frac{d\vec{V}_u}{dt}\right).$$

With the appropriate numerical approximation for dt (i.e., based on the design point operating speed), the above equation can be numerically evaluated. The total acceleration unit vector ($\vec{A}_u$) can now be computed and used to determine the points that define the rotor blade inner curve that, together with the rotor Base curve, define blades that are oriented parallel to the total local acceleration vector at each point along the flow path in the rotor stage. Computationally, this step is the same as shown above for the stator, but with the unit acceleration vector in place of the unit curvature vector.

Design of a Power Absorbing Dynamometer:

An initial step in the design process is the selection of a design operating point (i.e., P and $\omega$) and machine configuration (i.e., R, r, t, N, etc.). Then, the surface finish, or roughness, is selected. From this information, the design point recirculation factor (k) can be determined. Next, the outward pressure ($P_{shell}$) exerted on the torus wall must be determined so that structural issues can be addressed. Once the basics are defined, the next task is to generate blades for the machine, after which water feed and steam ventilation schemes must be contrived.

The operating point and basic size of the machine are established. The operating point is generally known, or at least easily determined from the driving engine characteristics. A basic machine size can be selected by picking upper and lower size limits. The machine surface roughness must be known, or selected as a design parameter. It has been determined that the recirculation factor and power absorption increase as the surface roughness is reduced. Next, the appropriate recirculation factor can be determined. In general, it is desirable to have a recirculation factor greater than unity, but it can be less than this. However, the recirculation velocity should not be too high, or erosion might become significant. To reduce the possibility of erosion, the maximum recirculation speed should be kept below, for example, 150 m/s (based on liquid flow over a flat plate) although this is not a firm upper limit. Clearly, the high pressure resulting from the large centrifugal field will act to reduce the propensity for bubble nucleation, which tends to reduce erosion, but there is no known data for determining a precise upper limit for this highly complex flow.

A condition that must be met is that the centrifugal force resulting from the recirculating liquid must be greater than or equal to the outward force imparted by the rotor, in the vicinity of the rotor hub, as represented by the following expression:

$$\frac{(kU(R))^2}{r} \geq \frac{(U(R-r))^2}{(R-r)}.$$

To ensure that this condition is met, the minor radius (r) should be selected such that it is less than the radius from the center of rotation to the hub (R-r). Once R is selected, then r can be chosen somewhat arbitrarily, but to be safe it is a good general rule to choose r to be at least 1.5 times smaller than the torus hub radius (R-r). Stated another way, once R has been selected then r should be chosen so that it satisfies the expression below:

$$r \leq \frac{R}{2.5}.$$

In other words, the radius ratio (r/R) should be no greater than 0.4 to ensure that the centrifugal force associated with the recirculating liquid is greater than the outward radial force imposed by the rotor. From examining this issue, it has been determined that performance is improved by decreasing the radius ratio. However, there are obvious limits to how far this can be taken since as the minor radius is reduced the overall volume inside the torus decreases. Therefore, the total working volume of liquid is reduced, as well as the size of the blades, which may lead to manufacturing difficulties. Increasing the major radius remedies this, but also makes the dynamometer outside diameter larger which in turn lowers the machine power density.

Another issue that must be addressed is the outward pressure acting on the torus shell that results from the high speed recirculating liquid sheet. This can be estimated by integrating the radial pressure gradient across the liquid flow sheet:

$$\int \frac{\partial p}{\partial r_l} = \int \rho \frac{V^2}{r_l}.$$

In this flow the pressure gradients in the bi-normal and streamline directions are negligible compared to the radial component, so the partial differential in the above equation can be approximated as an ordinary differential which enables the expression to be easily evaluated.

$$p_{shell} - p_{core} = \Delta p = \int_{r_i}^{r} dp \cong \int_{r_i}^{r} \rho \frac{V^2}{r_l} dr_l = \rho V^2 \ln\left(\frac{r}{r_i}\right)$$

The above equation can be used to estimate the outward pressure ($P_{shell}$) exerted on the torus shell at any point around the flow circuit, where $P_{core}$ is the vapor pressure in the torus core, r is the torus minor radius, $r_1$ is the local radius inside the liquid sheet, and $r_i$ is the radius to the surface of the liquid sheet at the particular point (in the flow circuit) of interest.

Variations, modifications, and other implementations of what is described herein will occur to those of ordinary skill in the art without departing from the spirit and the scope of the invention as claimed. Accordingly, the invention is to be defined not by the preceding illustrative description but instead by the following claims.

What is claimed is:

1. A power absorbing dynamometer, comprising:
    a stator having an inside stator surface;
    a rotor having an inside rotor surface and being rotatable by a mechanical power source, the rotor and the stator together defining a passage bounded substantially by the inside rotor and stator surfaces;
    a port for introducing a liquid into the passage; and
    means for developing and maintaining within the passage a substantially helical recirculating flow of the liquid on the inside rotor and stator surfaces as the rotor is rotated by the mechanical power source, whereby the liquid is heated or vaporized as the rotor is rotated by the mechanical power source and power absorbed from the mechanical power source is related to a rate at which the liquid is heated or vaporized.

2. The power absorbing dynamometer of claim 1 wherein at least some of the liquid in the passage vaporizes due substantially only to friction associated with the substantially helical recirculating flow of the liquid on the inside rotor and stator surfaces, and the power absorbed from the mechanical power source is related to the rate at which the liquid vaporizes.

3. The power absorbing dynamometer of claim 2 wherein:
    the rotor and stator together define the passage as a torus-shaped passage within the dynamometer which is bounded partly by the inside rotor surface and partly by the inside stator surface;
    the stator defines an outer stationary portion of the dynamometer;
    the rotor defines an inner rotatable portion of the dynamometer; and
    the rotor is rotatable about an axis passing through the center thereof by the mechanical power source.

4. The power absorbing dynamometer of claim 3 wherein the means for developing and maintaining the substantially helical recirculating flow within the passage includes means for passing the liquid from the port into the passage.

5. The power absorbing dynamometer of claim 4 wherein the means for developing and maintaining the substantially helical recirculating flow within the passage further includes means for venting the vaporized liquid out of the passage.

6. The power absorbing dynamometer of claim 5 wherein the vaporized liquid collects substantially at the center of the passage as the substantially helical recirculating flow of the liquid is maintained within the passage on the inside rotor and stator surfaces by the means for developing and maintaining the substantially helical recirculating flow while the rotor is rotated about the axis by the mechanical power source.

7. The power absorbing dynamometer of claim 6 wherein the port introduces enough of the liquid into the passage to fill partially the passage with the liquid.

8. The power absorbing dynamometer of claim 7 wherein the amount of liquid in the passage is related to the power absorbed from the mechanical power source.

9. The power absorbing dynamometer of claim 8 wherein the means for developing and maintaining the substantially helical recirculating flow within the passage comprises:
    a plurality of rotor blades extending from the inside rotor surface into the passage toward the stator, the plurality of rotor blades spaced approximately equally around the inside rotor surface, each of the plurality of rotor blades being adjacent to at least one other of the plurality of rotor blades; and
    a plurality of stator vanes extending from the inside stator surface into the passage toward the rotor, the plurality of stator vanes spaced approximately equally around the inside stator surface, each of the plurality of stator vanes being adjacent to at least one other of the plurality of stator vanes;
    wherein the plurality of rotor blades and stator vanes develop and maintain within the passage the substantially helical recirculating flow of the liquid on the inside rotor and stator surfaces as the rotor is rotated by the mechanical power source, the liquid flowing between adjacent ones of the rotor blades and between adjacent ones of the stator vanes as the substantially helical recirculating flow of the liquid flows within the passage on the inside rotor and stator surfaces.

10. The power absorbing dynamometer of claim 9 wherein the plurality of rotor blades and stator vanes are shaped such that a change of angular momentum of the substantially helical recirculating flow on the inside rotor and stator surfaces develops an active torque on the rotor and a reaction torque on the stator as the rotor is rotated by the mechanical power source such that the power absorbed from the mechanical power source is approximately equal to the fluid dissipation in the substantially helical recirculating flow caused by primarily viscous shear.

11. The power absorbing dynamometer of claim 9 wherein the plurality of rotor blades and stator vanes are shaped such that, for each of the rotor blades and stator vanes, a surface thereof is approximately parallel, at each point along the substantially helical recirculating flow, to an absolute acceleration vector of fluid particles in the substantially helical recirculating flow of the liquid flowing between that rotor blade or stator vane and one adjacent thereto.

12. The power absorbing dynamometer of claim 9 wherein the plurality of rotor blades and stator vanes are shaped for receiving without substantially inhibiting the substantially helical recirculating flow of the liquid on the inside rotor and stator surfaces.

13. The power absorbing dynamometer of claim 9 wherein the plurality of rotor blades and stator vanes are shaped for developing and maintaining the flow of the liquid within the passage at or above a velocity required to keep the liquid against the inside rotor surface as the rotor is rotated by the mechanical power source.

14. The power absorbing dynamometer of claim 9 wherein the plurality of rotor blades are integral with the inside rotor surface.

15. The power absorbing dynamometer of claim 14 wherein the plurality of stator vanes are integral with the inside stator surface.

16. The power absorbing dynamometer of claim 15 wherein the means for passing the liquid from the port into the passage comprises at least one of the plurality of rotor vanes defining at least one hole therein for passing the liquid from the port into the passage.

17. The power absorbing dynamometer of claim 16 wherein the means for venting the vaporized liquid out of the passage comprises at least one of the plurality of rotor vanes defining at least one hole therein for venting the vaporized liquid out of the passage.

18. The power absorbing dynamometer of claim 17 wherein the liquid comprises water.

19. The power absorbing dynamometer of claim 15 wherein the means for passing the liquid from the port into the passage comprises at least one of the plurality of stator vanes defining at least one hole therein for passing the liquid from the port into the passage.

20. The power absorbing dynamometer of claim 19 wherein the means for venting the vaporized liquid out of the passage comprises at least one of the plurality of stator vanes defining at least one hole therein for venting the vaporized liquid out of the passage.

21. The power absorbing dynamometer of claim 20 wherein the liquid comprises water.

22. A power absorbing dynamometer for converting liquid into vapor, comprising:

a stator defining an outer stationary portion of the dynamometer;

a rotor defining an inner rotatable portion of the dynamometer, the rotor being rotatable about an axis passing through the center thereof by a mechanical power source, the stator and the rotor together defining a torus-shaped passage within the dynamometer which is bounded partly by an inside surface of the stator and partly by an inside surface of the rotor;

a liquid feed port for introducing a liquid into the passage;

a plurality of rotor blades extending from the inside surface of the rotor into the passage toward the stator; and a plurality of stator vanes extending from the inside surface of the stator into the passage toward the rotor;

the plurality of blades and vanes shaped to develop and maintain within the passage a substantially helical recirculating flow of the liquid on the inside surfaces of the rotor and stator as the rotor is rotated about the axis by the mechanical power source, at least some of the liquid vaporizing due substantially only to friction associated with the substantially helical recirculating flow of the liquid on the inside surfaces of the rotor and stator, wherein power absorbed from the mechanical power source is related to the vaporization of the liquid.

23. The power absorbing dynamometer of claim 22 wherein at least one of the plurality of stator vanes defines at least one hole therein for passing the liquid from the port into the passage.

24. The power absorbing dynamometer of claim 22 wherein at least one of the plurality of stator vanes defines at least one hole therein for venting the vaporized liquid out of the passage.

25. The power absorbing dynamometer of claim 22 wherein at least one of the plurality of rotor blades defines at least one hole therein for passing the liquid from the port into the passage.

26. The power absorbing dynamometer of claim 22 wherein at least one of the plurality of rotor blades defines at least one hole therein for venting the vaporized liquid out of the passage.

27. The power absorbing dynamometer of claim 22 wherein the vaporized liquid collects substantially at the center of the passage as the substantially helical recirculating flow of the liquid is maintained within the passage on the inside surfaces of the rotor and stator by the plurality of rotor blades and stator vanes while the rotor is rotated about the axis by the mechanical power source.

28. The power absorbing dynamometer of claim 22 wherein the liquid feed port introduces enough of the liquid into the passage to fill partially the passage with the liquid.

29. The power absorbing dynamometer of claim 28 wherein the amount of liquid in the passage is related to the power absorbed from the mechanical power source.

30. The power absorbing dynamometer of claim 22 wherein the plurality of rotor blades are integral with the inside surface of the rotor.

31. The power absorbing dynamometer of claim 22 wherein the plurality of stator vanes are integral with the inside surface of the stator.

32. The power absorbing dynamometer of claim 22 wherein the liquid comprises water.

33. A method of absorbing power from a mechanical power source by converting liquid into vapor, comprising:

(A) providing a power absorbing dynamometer comprising
  a stator defining an outer stationary portion,
  a rotor defining an inner rotatable portion, the rotor being rotatable about an axis passing through the center thereof by the mechanical power source, the stator and the rotor together defining a torus-shaped passage within the dynamometer which is bounded partly by an inside surface of the stator and partly by an inside surface of the rotor, the rotor defining a plurality of blades extending from the inside surface of the rotor into the passage toward the stator and the stator defining a plurality of vanes extending from the inside surface of the stator into the passage toward the rotor, and
  a liquid feed port for introducing a liquid into the passage;

(B) introducing the liquid into the passage via the port; and (C) maintaining within the passage a substantially helical recirculating flow of the liquid on the inside surfaces of the rotor and stator as the rotor is rotated about the axis by the mechanical power source such that at least some of the liquid vaporizes due substantially only to friction associated with the substantially helical recirculating flow of the liquid on the inside surfaces of the rotor and stator, power absorbed from the mechanical power source being related to the vaporized liquid.

34. The method of claim 33 wherein step (B) comprises introducing enough of the liquid into the passage via the port to fill partially the passage with the liquid.

* * * * *